Patented Oct. 24, 1950

2,526,707

UNITED STATES PATENT OFFICE 2,526,707

PROCESS FOR THE PRODUCTION OF A COBALT SALT FROM ARSENIFEROUS ORES

John C. Stahl and Francis K. Shelton, Boulder City, Nev.

No Drawing. Application September 17, 1946, Serial No. 697,394

3 Claims. (Cl. 23—117)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to the lixiviation of cobalt from its ores and, more particularly, to the production of soluble cobalt salts from ores containing cobalt.

An object of this invention is to lixiviate or extract cobalt in high yield from ores thereof by the employment of a superior technique. Other objects and advantages will appear hereinafter as the ensuing description proceeds.

These objects are accomplished in accordance with this invention wherein a soluble cobalt salt is produced by roasting a cobalt ore under alternate oxidizing and reducing conditions at an elevated temperature below that at which ferrite formation occurs, then extracting the roasted ore with hot mineral acid, and recovering a cobalt salt from the solution. By the expression "alternate oxidizing and reducing conditions" it is intended that during a portion of the roast oxidizing conditions shall prevail, and during another portion of the roast reducing conditions shall prevail.

While we primarily propose to treat cobaltite ores and concentrates, the present process is applicable to ores, concentrates, speisses, and mattes, containing cobalt. Linnaeite, smaltite, erythrite, skutterudite, carrollite, cobaltous pyrite, or oxide cobalt ores can be treated by our process. Erythrite ores do not absolutely require roasting, although this aids in opening them. Stainierite and heterogenite ores also require no roasting.

To some slight degree at 700° C., more pronounced at 800° C., and becoming prominent at above 850° C., the cobalt and iron compounds in a roast, probably the oxides, appear to unite to form cobalt ferrites. At least, we find that above 800° C., a certain percentage of the cobalt, not compounded with arsenic, becomes strongly acid-insoluble, and the percentage of insoluble cobalt increases with an increase in temperature and length of roast, although this last factor is not firmly established. Moreover, the cobalt-containing residue is strongly magnetic; yields its cobalt only in very concentrated boiling mineral acids, notably hydrochloric acid; has an iron/cobalt ratio of about 2.2; and the residual cobalt and iron is leached from the residue at about equal rates. Usually, only minor amounts of arsenic are present in the residue. Further, these compounds can be made to yield their cobalt to acids as weak as a pH of 1.5 by giving them a reducing roast above a temperature of about 600° C., opportunely between 700 and 800° C., using fuel gases, fuel oils, coal, coke, pyrite, elemental sulfur, sulfur dioxide, or other known reducing agents to reduce the material. Since iron-free cobalt ores are infrequent, the formation of these ferrites in the roast operates as an upper limit for satisfactory roasting for acid leaching; as an alternative, higher roasts followed by the reducing roast can be made, but these are somewhat erratic in their action, and sometimes lower the percentage of cobalt extraction due to reducing arsenate cobalt to the acid-insoluble arsenide cobalts.

Certain cobaltite and other cobalt ores and speisses have a tendency toward stickiness, agglomeration, or initial fusion during roasting. One cobaltite concentrate, containing 25.2% cobalt, 32.1% arsenic, 24.1% sulfur, 10.0% iron and 1.0% copper, showed this point at roughly 725° C. To avoid the sticking in this concentrate, it had to be roasted for the first two hours at between 650 and 700° C. Not all the ores and concentrates of cobaltite examined exhibited this condition, but when it does exist, the plastic condition limits the upper usable roast temperature. Incomplete roasting, clogging of roasting equipment, and grinding of the calcine for leaching are conditions to be met when this fusion is permitted.

Only a portion of the arsenic can be volatilized from an arseniferous cobalt ore by heating or roasting. The percentage volatilized increases with the temperature, hence we prefer to roast these materials at as high a temperature as possible, it being limited by the ferrite formation and sticking discussed above. Sulfur, we have found, is readily roasted from cobalt ores, and for this purpose any temperature above that of about 450° C. and below the temperature of ferritization is suitable. Indeed, lower temperatures tend to convert part of the sulfur to the cobalt sulfates, which are soluble in water alone. The arsenic which is not roasted off, is converted to arsenates, as heretofore defined. Ordinarily, at 600° C., roughly 60% of the arsenic in a cobaltite concentrate (analyses in Table 2), is found to be roasted off in 6 hours. We have had satisfactory roasts at from about 450° to 900° C., insofar as the sulfur and arsenic treatment were concerned. However, roasts between 550 and 700° C. are best to avoid ferrite formation and still volatilize a maximum of the arsenic (when present). Ordinarily, we choose a range of from 600 to 650° C. as the point at which the cobalt is obtained in solution to the best degree and with the greatest ease. Time of roasting is related to the temperature; at 450° C., 10-hour or longer roast periods are sometimes necessary; about 550° C., 7-hour roasts are satisfactory, while 4-hour or shorter roasts have been found excellent under idealized conditions at from 600–650° C. Time is therefore a limiting factor against a low-temperature roast.

To further eliminate arsenic from the calcine, we have found it possible to add elemental sulfur, pyrite, coal, fuel gases, fuel oils, or in general, to provide a temporary reducing atmosphere in the roast to enhance arsenic volatilization. These materials may be added at any stage of the roast; however, addition during the latter stages of the roast seems as beneficial as their introduction with the head ore. A final oxidation period is necessary (providing metallization has not occurred) to maintain high leachability of the calcine's cobalt. By adding 40 parts of sulfur to 50 parts of calcine and reheating at from 850 to 900° C. for two hours, 89.1% of the residual arsenic was volatilized; under similar conditions coal removed 53 to 62% of the arsenic and pyrite, 81.4%.

Roasting sulfide-containing cobalt materials at temperatures between 425 to 625° C. will form a certain percentage of $CoSO_4$ in the calcine; the lower the temperature, generally the higher the sulfating action. In predominantly sulfide cobalt ores we therefore sometimes lower the temperature in order to form more $CoSO_4$ and, in this manner, economize on the use of acid in leaching. $CoSO_4$ is very soluble in water. Due to the increasing formation of arsenates at lower temperatures, we ordinarily do not use this on cobaltite concentrates.

For satisfactory roasting we recommend that the material be in a relatively fine state of division. Particles larger than ½″ in size roast very incompletely and slowly, and for good short-time roasts, −10 mesh materials are recommended. We found by experiment that −35 mesh, −65 mesh, and −100 mesh materials roasted with equal facility, and almost equally well. The finer particles are more satisfactory for leaching. Standard type multiple-hearth furnaces, kilns, or reverberatory type roasters can be used for the roasting. We make no claim to the invention of any roasting equipment.

To satisfactorily leach cobalt from the calcine, mineral acids may be used, such as sulfuric acid, muriatic acid, nitric acid, or in general, mineral acids forming relatively soluble cobalt salts. The cobalt dissolves from the calcine more readily in high acid than in low acid concentrations in solution, although the same weight of acid be not present in both solutions. While we have investigated $H_2SO_4$ solutions as weak as pH 1.5, by actual test on the cobaltite calcine described in Example 1, 99.8% of the cobalt was dissolved in 20% (volume) near-boiling sulfuric acid solutions; 68.8% in 6% cold $H_2SO_4$, and only 24.2% in an acid of pH 1.5. In each case, sufficient acid was used to dissolve the cobalt and provide considerable excess. For the dissolution of cobalt oxides, and a portion of the arsenates, 10% (volume) $H_2SO_4$ solutions have been found excellent, utilizing the concentration indicated above. The controlling factor on the upper side of acid concentration is to secure a cobalt sulfate solution which can be separated from the residue. Excessive concentrations, say 100 g./l. cobalt or more, yield extremely viscous solutions and the solid residue is very difficult to settle out, filter, or otherwise remove from the solution. Moreover, repeated washings are needed to free the residue from soluble cobalt when the solution is too concentrated in cobalt. For this reason, we ordinarily use 5 to 10% (volume) sulfuric acid solutions for leaching, or else use stronger solutions and then dilute them for separating the liquids and residues. The efficiency of leaching at stoichiometric ratios of cobalt to acid is ordinarily above 90% as good as when twice this amount of acid is used. For this reason, in the cold leaches, we ordinarily employ from 1.2 to 1.5 times the theoretical acid required to leach out the cobalt. The quantity of acid is naturally also related to the other acid-soluble constituents of the material undergoing treatment. The pulp density is ordinarily relatively high. When 10% acid is used on 15% cobalt calcines the pulp contains about 40% solids; at least 30% solids seems expedient (although we have tested leaches in which the solid content was as low as 2 or 3%). Quite naturally, the pulp density is controlled by the acid concentration and amount of pulp used. We have found a 4-hour leach economic under these conditions; however, this can be reduced to one hour with perhaps 25% lowering in leach efficiency. As a generality, we find that about 70% of the cobalt can be leached from a cobaltite calcine (calcined 7 hours at from 600–625° C.) in 4 hours with 10% volume $H_2SO_4$. Engineering factors could probably be aided by extending the length of the leach.

To leach cobalt arsenates (and erythrite) completely, we recommend hot, 20% (volume) $H_2SO_4$ solutions in 3-hour leaches. These leaches may be from 30 minutes to more than 6 hours, depending upon the refractoriness of the arsenate toward leaching. Cold sulfuric acid over long periods of time will also leach the arsenate, perhaps less completely. However, at a pH in the neighborhood of 1.2 to 1.7, cobalt arsenates precipitate from cold solutions, as described in Example 4; hence we must maintain a cold pH concentration of acid of about these values, as a minimum. As more fully described below, we ordinarily leach calcines, first in 10% acid in the cold, and then extract the cobalt in the residue with hot 20% acid for maximum cobalt extraction. We fully recognize the necessity of maintaining at least a minimum acid concentration, for the arsenate leaching, of at least 1.2.

We have also found it possible to remove the arsenates from the calcine by treating them with soda ash, sodium hydroxide, $NaNO_3$ or combinations of these in the latter stages of cobaltite roasting, and removing the soluble sodium salts formed by water leaching, preferentially, but not necessarily hot. The alkali metal arsenates can be formed from the alkali metal carbonates, hydroxides, or nitrates, and the calcine, at temperatures above 500 or 600° C., preferably between 700 and 800° C.

For leaching stainierite, or heterogenite, (authorities differ) and other oxide cobalt ores, we recommend the use of $H_2SO_4$ solutions into which reducing reagents are introduced, c. g., copperas, hydrogen, hypo, or the like. We ordinarily utilize 5% (volume) $H_2SO_4$ solutions through which sulfur dioxide is slowly bubbled. The leach is for approximately 24 hours, with a solution to ore ratio of 3.1. Sufficient acid and $SO_2$ are used to leach the cobalt; ordinarily 2 or 3 pounds each are required per pound of cobalt leached. More efficient utilization of the $SO_2$ can be obtained from better designed equipment. We make no claim to the invention of any leaching equipment.

As examples of the practice of our invention, we give the following:

EXAMPLE 1

Three thousand eight-hundred-and-eighty grams of cobaltite concentrates, analyses of which are given in Table 1, were gradually raised from 450 to 650° C. in two hours in a standard Globar electrically heated furnace, and roasted at from 650 to 700° C. for the following 5 hours. The maximum temperature was 712° C. The sample was held in a porcelain tray. Excess air was present at all times. The materials, —48 mesh in size, were rabbled at 30-minute intervals. No fusion or sintering occurred in the roast. The calcine weighed 3,215 grams, and the distribution of the contained metals is also given in Table 1.

*Table 1.—Cobalt roasting data*

| Metal | Analyses, percent | | Distribution in roast products, per cent | |
|---|---|---|---|---|
| | Concentrates | Calcine | Calcine | Volatilized and losses |
| Cobalt | 10.98 | 13.20 | 99.62 | 0.38 |
| Iron | 20.26 | 23.98 | 98.08 | 1.92 |
| Copper | 1.30 | 1.38 | 87.97 | 12.03 |
| Arsenic | 16.64 | (¹) | 47.27 | 52.28 |
| Sulfur | 33.64 | 0.51 | 0.13 | 99.87 |
| Nickel | 0.20 | Tr. | | |
| Gold | ² 0.62 | ² 0.75 | 100.2 | —0.2 |
| Silver | ² 0.40 | ² 0.48 | 99.42 | 0.58 |
| Insoluble | 13.72 | | | |

¹ Analysis in error.  ² Ounces per ton.

By leaching samples of the calcine with twice the theoretical $H_2SO_4$ needed, as boiling 20% (volume) solutions, 99.8% of the cobalt and 99.9% of the arsenic was dissolved in 3 hours. Leaching in cold, 6% (volume) $H_2SO_4$ for 24 hours dissolved 68.8% of the cobalt, while only 24.2% was dissolved in an excess acid of pH held between 1.5 and 2.5, in a 48-hour leach. All leaches were stirred intermittently.

EXAMPLE 2

The analysis of 140 pounds of cobaltite concentrates, which we secured from the Salt Lake City station of the U. S. Bureau of Mines, is given in Table 2. These concentrates had been produced there by differential flotation from cobaltite ores occurring in the Blackbird Creek district of Idaho. The original ore analyzed 3.8% cobalt, other analysis of which are not available.

*Table 2.—Analysis of cobaltite concentrates*

| Concentrates | Per cent | Concentrates | Per cent |
|---|---|---|---|
| Arsenic | 22.00 | Manganese | Tr. |
| Cobalt | 15.21 | Nickel | 0.14 |
| Copper | 0.30 | Silver | ¹ 1.0 |
| Gold | ¹ 0.47 | Sulfur | 9.14 |
| Insoluble | 29.4 | Water at 110° C | 0.83 |
| Iron | 8.25 | Zinc | Nil. |
| Lead | Nil. | | |

¹ Ounces per ton.

On a continuous basis, 49.5 kilograms of this ore were roasted for use in a 250-gram per day cobalt pilot plant. The individual roasts contained 700 grams of the concentrates, and were conducted in an electrically heated laboratory muffle furnace. The concentrates, during calcination, were held in a Type 316 stainless steel tray. Roasting time was seven hours, and temperatures were controlled by rheostats to within approximately 20° C. The calcine was thoroughly hand-rabbled at 30-minute intervals. From June 15 to 19, the roast temperatures were from 600 to 625° C.; on June 19, this was lowered to 550° C.; however, leachability of the cobalt was also found to be lowered so, on June 25, the roast temperature was again raised to the 600–650° C. range. Roasting was concluded on July 8. During the whole series of roasts average loss of weight in calcination was 10.47%.

To 1,900 grams of calcine, 2,800 milliliters of a 10% (volume) $H_2SO_4$ (66° Bé. commercial acid was used) solution was added, and the pulp vigorously agitated for 4 hours. The agitation vat was a lead cylinder 6 inches in diameter, 18 inches tall, and ¼ inch thick. A stainless steel electrically driven impeller was used to maintain the solids in suspension in the liquid; velocity of the stirrer was about 500 R. P. M.

All solids and solution from this leach, for the first two or three days, were separated by filtration on a Buchner type filter. A typical leach solution was found to contain 76.26 g./l. cobalt; 5.88 g./l. iron, and 71.40 g./l. arsenic. After three or four days, we found it better to add 800 milliliters of water to the leach pulp at the end of the leach, decant the pulp into a 4,000 milliliter glass beaker, and settle out the solids; this was done at an average rate of 2½ inches per hour. The settled solids occupied 40 to 50% of the original volume. A typical solution from this contained 62.50 g./l. cobalt, 6.32 g./l. iron, and 67.10 g./l. arsenic. The solids from either the filtration or the settling of leaches were then treated in a two-stage countercurrent leach to lixiviate the undissolved cobalt arsenates. Solids from the cold leach were introduced into the second stage, together with the liquid from the third stage, and agitated for three hours, the pulp being held at 90° C. The solids were separated from the liquid at the end of the leach, either by filtering (relatively rapid in the hot solution) or settling. In one test the solution contained 21.06 g./l. cobalt. The residue from the second stage was then leached at above 90° C. for two hours in the third stage with 1,400 milliliters of a 20% (volume) $H_2SO_4$ solution. The $H_2SO_4$ content of the first leach solution averaged 15 to 25 g./l.; of the second, 10 to 25 g./l.; and of the third, 85 to 125 g./l. The solution was filtered from the solids in the third leach, and the residue washed. In a series of tests covering one leach per day for approximately 24 days, 84.66% of the cobalt was extracted; however, this was raised to 91.48% by thoroughly washing the 74 pounds of residues. Since these leaches included the 550° C. roast series, recovery was somewhat lower than in the better leaches, typified by those obtained between July 9 and 12, in which the residues analyzed as follows:

| Date | Per cent Cobalt |
|---|---|
| July 9 | 1.84 |
| July 10 | 0.94 |
| July 11 | 3.94 |
| July 12 | 1.50 |

During the campaign, the $H_2SO_4$ consumption was 3.2 pounds per pound of cobalt leached. The consumption was almost equally balanced between the hot and cold leaches. It is possible that better acid utilization could be obtained in further tests, and hence values given are illustrative, and not the best obtainable. Ordinarily, the leach solutions from the first and second leaches were combined for cobalt recovery, but the exact order of leaching is not set by this example. It is obvious that one stage is needed to leach the arsenate with high acid; a multiple leach is for engineering, rather than patent reasons.

EXAMPLE 3

To determine the acid consumption in leaching a calcine, 500 grams of the cobaltite of Table 2 were roasted at between 500 and 600° for 8 hours. The calcine weighed 463 grams, and analyzed 16.72% cobalt; 15.57% arsenic; and 0.44% sulphur. Nine aliquot samples of this calcine, each weighing 46.3 grams, were formed; 5 of these were leached for 5 hours with agitation in varying amounts of 10% (volume) $H_2SO_4$, and 4 in 5% (volume) acid. The data on the leached cobalt is shown in Table 3.

*Table 3.—Acid consumption in cobalt leaching*

| Ratio of Solution to Calcine | Per Cent Total Cobalt Leached | End pH of Soln. | g./l. Cobalt Solution (Calculated) | Mol Ratio $H_2SO_4$/Cobalt | |
|---|---|---|---|---|---|
| | | | | Leached Cobalt | Total Cobalt |
| 10% $H_2SO_4$: | | | | | |
| 1.2 | 68.8 | 0.45 | 85.4 | 1.31 | 0.903 |
| 1.5 | 70.4 | 0.15 | 67.6 | 1.66 | 1.17 |
| 2.0 | 74.2 | Below 0 | 57.6 | 1.95 | 1.45 |
| 2.5 | 73.0 | Below 0 | 44.6 | 2.52 | 1.84 |
| 3.0 | 75.6 | Below 0 | 39.7 | 2.84 | 2.14 |
| 5% $H_2SO_4$: | | | | | |
| 2.4 | 64.6 | 0.80 | 42.7 | 1.32 | 0.85 |
| 3.0 | 67.2 | 0.65 | 36.5 | 1.54 | 1.032 |
| 4.0 | 70.8 | 0.45 | 28.6 | 1.97 | 1.39 |
| 5.0 | 67.7 | 0.30 | 19.1 | 2.94 | 1.99 |

Gram for gram, the 10% acid leached more cobalt than did the 5% acid. Moreover, the concentration of cobalt in the leach liquor from the last 5% leach shows that the purification costs of cobalt will tend to be greatly increased due to the relatively large volumes of liquid to be handled. It also appears that stoichiometric ratios of $H_2SO_4$/cobalt of 1:2 is almost as good as 2:1 in the 10% acid leaches.

EXAMPLE 4

To show it is necessary to leach cobalt arsenates in relatively strong acids, proof was indirectly obtained in the following manner: To 7,370 milliliters of solution obtained by leaching a cobalt calcine with $H_2SO_4$ was added 23.8 Bé. soda ash solution to form the series of precipitates mentioned in Table 4. The soda ash was added slowly from a Burette to the vigorously agitated solution, to the higher pH value of individual precipitates, and the solids filtered off, weighed and analyzed. The original solution analyzed 12.04 g./l. cobalt, 4.75 g./l. arsenic, 1.17 g./l. copper, 1.75 g./l. iron, and 76.8 g./l. $H_2SO_4$, (pH 0.03). Note that insufficient iron is present to precipitate the arsenic as $FeAsO_4$. pH values were mixed by a standard Model "G" Beckman pH meter.

*Table 4.—Distribution of metals in various pH ranges*

| pH Limits | | Percentage of Total Metal Precipitated in Given pH Limits | | | |
|---|---|---|---|---|---|
| Low | High | Cobalt | Arsenic | Copper | Iron |
| 0.03 | 1.33 | 6.85 | 39.73 | 24.92 | 92.23 |
| 1.33 | 2.38 | 1.02 | 4.00 | | 7.77 |
| 2.38 | 4.28 | 17.56 | 31.68 | 66.15 | 0.0 |
| 4.28 | 6.62 | 17.30 | 21.21 | 4.71 | 0.0 |
| 6.62 | 7.45 | 36.37 | 1.00 | 2.53 | 0.0 |
| 7.45 | 8.77 | 20.17 | 0.67 | 1.69 | 0.0 |
| 8.77 | 14.00 | 0.72 | 1.71 | 0.0 | 0.0 |

As can be deduced from this table, these cobalt arsenates are totally soluble in solutions containing 75 g./l. sulphuric acid, but are partly insoluble in solutions of pH 1.33 (theoretically 2.29 g./l. $H_2SO_4$, but since the exact ionization of the acid is not known, it is thought this would titrate near 5 g./l. acid). Incidentally, cobalt carbonates do not precipitate from 12 g./l. cobalt solutions until a pH somewhere between 6.5 and 7.5 is reached.

EXAMPLE 5

To illustrate the effect of temperature in the formation of cobalt ferrites, a sample of the calcine of Table 1 was re-roasted for one hour at between 950 to 982° C. Only 17.8% of the cobalt was extracted by agitating this calcine with an excess of cold, 6% (volume) sulphuric acid in 16 hours, although in two tests; (a) 65.5% and (b) 68.8% of the cobalt was leached in the same acid in the same time from the original calcine.

In another test, 43 pounds of the cobaltite concentrate (analysis given in Table 5) were roasted for 8 hours. For the first 3 hours, the roast was maintained at a temperature below 700° C., to avoid stickiness in the concentrate, and for the final 5 hours at between 700 and 750° C. The calcine was reduced to −20 mesh and mixed with 6 pounds each of $Na_2CO_3$ and $NaNO_3$, and this mixture roasted for 4 hours at a temperature gradually increasing from 750 to 930° C. The object of this roast was to form sodium arsenates from the arsenates in the initial calcine. There resulted a strongly sintered mass; this was pulverized to pass through a 65 mesh screen and given a water leach to dissolve out the sodium arsenate formed. Data on this and other subsequent leaches is given in Table 5.

*Table 5.—Analyses of cobaltite products*

| | Analyses, Per cent | | | | Ratio Fe/Co |
|---|---|---|---|---|---|
| | Co | Fe | As | Cu | |
| Head Sample, Unroasted | 25.2 | 10.0 | 32.1 | 1.0 | 0.4 |
| Roast Sinter | 34.9 | 14.1 | 5.2 | 3.2 | 0.4 |
| Water-Leached Sinter | 34.98 | 15.0 | 4.22 | 3.1 | 0.4 |
| 10% Acid Leach Residue | 17.72 | 29.4 | 1.50 | 1.7 | 1.66 |
| 20% Acid Leach Residue | 14.96 | 32.8 | 0.6 | 2.8 | 2.19 |
| 100% Acid Leach Residue | 15.88 | 37.2 | 0.8 | 0.5 | 2.34 |

An 18-pound portion of the water-leached calcine was agitated with 17 pounds of $H_2SO_4$ and 19 gallons of water for 32 hours, and the solution removed. Data on the residue, which weighed 5 pounds, is given in the preceding table.

The residue from the last leach was re-pulped in 50 pounds of water and 12 pounds of commercial $H_2SO_4$, and agitated for 24 hours at temperatures ranging from room to 80° C. The residue was removed from this solution, dried, and found to weigh 3 pounds. Analysis has been given in Table 5. Eleven hundred and ninety grams of this residue was blended with 290 milliliters of 1.84 sp. gr. $H_2SO_4$, and the mixture baked on a hotplate at the approximate temperature of 350° C. for two days. This product was water-leached and yielded a residue weighing 1,059 grams, dry. Its analysis is also included in Table 5. Only 5.53 percent of the cobalt was leached in the last step. (Note the low arsenic content of the last two residues.) The results show that a portion of the roast products is insoluble in $H_2SO_4$ of any concentration, although arsenic is nearly absent from the materials. The Fe/Co ratio is nearly a constant in the last two residues, indicating a definite union between the two.

Dissolution of the last residue with hydrochloric acid was tested. A sample was boiled in 25 milliliters of 1.18 sp. gr. HCl and 75 milliliters of water for 2 hours, and 50% of the cobalt, together with 46.6% of the iron was found in solution. The residue from the first HCl treatment was pulped with 1.18 sp. gr. HCl and heated to dryness on a hotplate. From the residue, enough of the cobalt and iron was extracted by pure water to raise the total cobalt extraction to 98.2% and the iron to 100.0%. These results indicated a definite cobalt-iron compound was being leached.

EXAMPLE 6

The reduction roasting of −100 mesh cobalt ferrites (previously prepared by removing the sulphuric acid soluble portions from a cobaltite calcine, as in Example 5) in fuel gas atmospheres was investigated in a laboratory type combustion tube furnace and other equipment, ordinarily employed in carbon analyses in iron. Ten-gram charges of the ferrites were placed in boats and heated in the fuel gas atmosphere (largely propane containing some butane) for one hour at different temperatures. The reduced calcine was then leached in $H_2SO_4$ solutions never stronger than pH 1.5, and never weaker than pH 2.5, maintained by the addition of acid when the pH approached the latter figure. An excess of acid was present at the end of the leaching. Table 6 gives the data secured.

Table 6.—Reduction of cobalt ferrites by fuel gases

| Temp. of Roast, °C. | Weight of Calcine | Percent of Total Metal Leached in Acid Between pH 1.5 and 2.5 | |
|---|---|---|---|
| | | Cobalt | Iron |
| 600±10° | 8.9 | 93.7 | 43.6 |
| 800±10° | 8.3 | 99.4 | (¹) |
| 900±10° | 6.4 | 100.0 | 97.8 |
| 950±15° | 7.2 | 100.0 | 98.2 |

¹ Contaminated.

These results show that a reducing roast using fuel gases (or oils volatilized at temperatures used) will yield a product from which the cobalt can be extracted by weak acids.

Mixing the same sample of cobalt ferrite with ⅙ of its weight of coal and heating for 1.5 hours to 980° C., resulted in a partial reduction of the ferrite to metals. Leaching this in cold 6% $H_2SO_4$ extracted 71% of the cobalt in 16 hours. Heating 30 parts of the ferrite with 10 parts of charcoal for one hour at 900° C., adding 10 parts of charcoal, heating for one more hour at 900° C., and leaching the residue in 6% $H_2SO_4$ for 18 hours leached 97.2% of the total cobalt.

EXAMPLE 7

Using a stainierite flotation concentrate purchased from H. S. Woodward of Goodsprings, Nevada, analysis of which is given in Table 7, three leach tests were made. The concentrate had been prepared by flotation from the cobalt ores occurring in the Columbia Mine, near Goodsprings, and was −65 mesh.

Table 7.—Analysis of stainierite concentrate

| Concentrate | Per cent | Concentrate | Per cent |
|---|---|---|---|
| Arsenic | 0.5 | Magnesium | 3.5 |
| Calcium | 5.7 | Manganese | 0.2 |
| Cobalt | 7.04 | Nickel | 0.3 |
| Copper | 15.0 | Water, at 110° C | 2.3 |
| Iron | 9.1 | Zinc | 0.2 |
| Lead | 0.5 | | |

The concentrates were pulped in 5% (volume) $H_2SO_4$ solution, the concentrate to solution ratio being 1:3. The pulp was vigorously stirred with an electric stirrer, to maintain the solids in suspension, and leaching was in a lead-lined tank. Sulphur dioxide was bubbled, in a slow stream, through the pulp during leaching. Table 8 presents the data secured.

Table 8.—Stainierite leaching with $H_2SO_4$ and $SO_2$

| Test | Weight Concentrates Leached, Pounds | Leach Time, Hours | Pounds Reagent Used per Pound Cobalt Leached | | Distribution per cent Cobalt in Leach Products | |
|---|---|---|---|---|---|---|
| | | | $H_2SO_4$ | $SO_2$ | Solution | Residue |
| 1 | 100 | 24 | 2.85 | 2.13 | 98.62 | 1.38 |
| 2 | 200 | 14 | 1.74 | 2.83 | 97.4 | 2.6 |
| 3 | 214.5 | 17.5 | 3.27 | 1.46 | 97.0 | 3.0 |

Sulphur dioxide alone will leach the cobalt from a stainierite pulp, however, our results were somewhat inferior to the above; this might in part be due to the crude apparatus employed in this series of tests.

EXAMPLE 8

An investigation was made into the time-temperature function of cobaltite roasting. The cobaltite contained 13.2% cobalt. At 400° C., none of the cobalt was water-soluble, only 0.64% was leached in 2% $H_2SO_4$ solutions after an 8-hour roast, and but 1.32% after a 24-hour roast. This appears to be a practical minimum for cobaltite roasting temperatures. At 500 to 600° C. Table 9 shows the amount of cobalt soluble in water (i. e. converted to $CoSO_4$), and in cold 2% $H_2SO_4$ in 4 hours.

Table 9.—Time-temperature roasting for leaching

| | Hours at 500° C. | | | Hours at 600° C. | | |
|---|---|---|---|---|---|---|
| | 24 | 48 | 72 | 6 | 10 | 24 |
| Percent Cobalt Soluble in Water | 4.3 | 1.4 | 1.8 | 4.05 | 5.20 | 5.30 |
| Percent Cobalt Soluble in $H_2SO_4$ | 85.7 | 80.8 | 79.7 | 86.45 | 88.30 | 82.2 |

This shows that the shorter roasts provide almost as good leaching as the much longer ones. While more of the cobalt is converted to $CoSO_4$ in this test at 600° C., the general rule is that more is converted at 500° C. if our experience is typical.

EXAMPLE 9

To examine the strength of acid required to leach all of the cobalt from a cobaltite calcine, the following set of experiments were performed: Samples of the cobaltite concentrate mentioned in Example 8 were calcined for the time and temperature given in Table 10. This calcine was then leached for 24 hours in excess cobalt electro-winning electrolyte (containing about 17 g./l. cobalt, as the sulphate; 50 g./l. boric acid; 5 g./l. sodium fluoride; and enough $H_2SO_4$ from the electrolysis to give it a pH of 1.5). The neutralized electrolyte was filtered off. To 25 grams of the residue was added 200 milliliters of water and the indicated amount of 1.84 sp. gr. $H_2SO_4$, and the cobalt leached for 3 hours at above 90° C., with intermittent stirring. The data, thus secured, is summarized in Table 10.

*Table 10.—Acid leaching of residue*

| Roast at— | | Milliliters Acid Added | Percent Cobalt Leached from Residue | Overall Extraction, Percent | | |
|---|---|---|---|---|---|---|
| °C. | Hours | | | Electrolytic pH 1.5 | High Acid Leach | Cumulative Leached |
| 700 | 2 | 25 | 88.4 | 52.8 | 36.4 | 89.2 |
| 600 | 6 | 25 | 88.1 | 54.1 | 40.5 | 94.6 |
| 600 | 6 | 50 | 99.5 | 57.1 | 42.7 | 99.8 |

From this data, it would appear best to leach the final portions of the cobalt in the acids of relatively higher strength.

Since many apparently differing embodiments of the invention will occur to one skilled in the art, various changes can be made in the invention without departing from the spirit and scope thereof.

What is claimed is:

1. A process for the production of a cobalt salt from arseniferous ores thereof containing also iron, which comprises first subjecting such an ore to a reducing roast below the temperature of fusion, then subjecting the ore to an oxidizing roast at a temperature of about 600° C. to 700° C., thereafter extracting the thus roasted ore with a mineral acid capable of forming soluble cobalt salts and having a concentration of about 10 to 20%, and recovering a purified cobalt salt from the resulting solution.

2. The process of claim 1 wherein sulfuric acid is employed to yield cobalt sulfate.

3. The process of claim 1 wherein sulfuric acid containing sulfur dioxide is employed to yield cobalt sulfate whereby higher oxides of cobalt are dissolved.

JOHN C. STAHL.
FRANCIS K. SHELTON.

REFERENCES CITED

The following references are of record in the file of this patent:

UNITED STATES PATENTS

| Number | Name | Date |
|---|---|---|
| 1,835,878 | Karrick et al. | Dec. 8, 1931 |
| 1,868,414 | Gronwall | July 19, 1932 |

FOREIGN PATENTS

| Number | Country | Date |
|---|---|---|
| 8,922 | Great Britain | of 1887 |
| 13,800 | Great Britain | of 1851 |

OTHER REFERENCES

Hackh's Chemical Dictionary, second ed., p. 471; pub. 1937.

Mellor: "Comprehensive Treatise on Inorganic and Theoretical Chemistry," vol. 14, page 436 (1935), London.